United States Patent
Zhang

(10) Patent No.: US 8,720,076 B2
(45) Date of Patent: May 13, 2014

(54) CONCENTRICITY TEST DEVICE

(75) Inventor: Bing-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 130 days.

(21) Appl. No.: 13/455,149

(22) Filed: Apr. 25, 2012

(65) Prior Publication Data

US 2013/0219731 A1 Aug. 29, 2013

(30) Foreign Application Priority Data

Feb. 27, 2012 (CN) .......................... 2012 1 0045256

(51) Int. Cl.
*G01B 5/20* (2006.01)
(52) U.S. Cl.
USPC .............................................. 33/550; 33/832
(58) Field of Classification Search
USPC .................... 33/550, 551, 792, 794, 802, 832
See application file for complete search history.

(56) References Cited

U.S. PATENT DOCUMENTS

| | | | | |
|---|---|---|---|---|
| 1,624,654 A * | 4/1927 | Brittain, Jr. | | 33/794 |
| 1,771,858 A * | 7/1930 | Mohr | | 33/792 |
| 5,301,436 A * | 4/1994 | Johnston | | 33/551 |
| 6,092,411 A * | 7/2000 | Tokoi | | 33/550 |
| 7,716,845 B1 * | 5/2010 | Willis | | 33/506 |
| 7,748,134 B1 * | 7/2010 | Wang | | 33/551 |
| 8,336,225 B1 * | 12/2012 | Zhang | | 33/836 |
| 2003/0126754 A1 * | 7/2003 | Berger | | 33/506 |
| 2009/0031573 A1 * | 2/2009 | Zhang et al. | | 33/555.1 |
| 2009/0094851 A1 * | 4/2009 | Xiao et al. | | 33/832 |
| 2010/0313436 A1 * | 12/2010 | Nakayama et al. | | 33/558 |
| 2013/0298414 A1 * | 11/2013 | Zhang | | 33/502 |

* cited by examiner

*Primary Examiner* — G. Bradley Bennett
(74) *Attorney, Agent, or Firm* — Novak Druce Connolly Bove + Quigg LLP

(57) ABSTRACT

A concentricity test device includes a bracket, a positioning member, an operation member, and a probe indicator. The bracket includes a beam, and opposite first and second supporting arms. The positioning member is pivotably connected to the first supporting arm and includes a shaft. A pierced round workpiece is placed around the shaft. The operation member is pivotably connected to the second supporting arm and includes a pole detachably locked to the shaft. The probe indicator is fixed to the beam, and includes a spring-loaded probe and a gauge head connected to the probe to engage with a circumference of the workpiece. The pole, the shaft and the workpiece are rotated 360 degrees, values shown by the probe indicator show moving distances of the probe, and a maximal difference value of the moving distances of the probe reveals the concentricity of the workpiece.

13 Claims, 4 Drawing Sheets

US 8,720,076 B2

CONCENTRICITY TEST DEVICE

BACKGROUND

1. Technical Field

The present disclosure relates to a concentricity test device.

2. Description of Related Art

A three-dimensional measuring device can be employed for testing concentricity of a thin pierced round workpiece. However, using a three-dimensional measuring device is time-consuming, which cannot satisfy the demands of mass-production.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
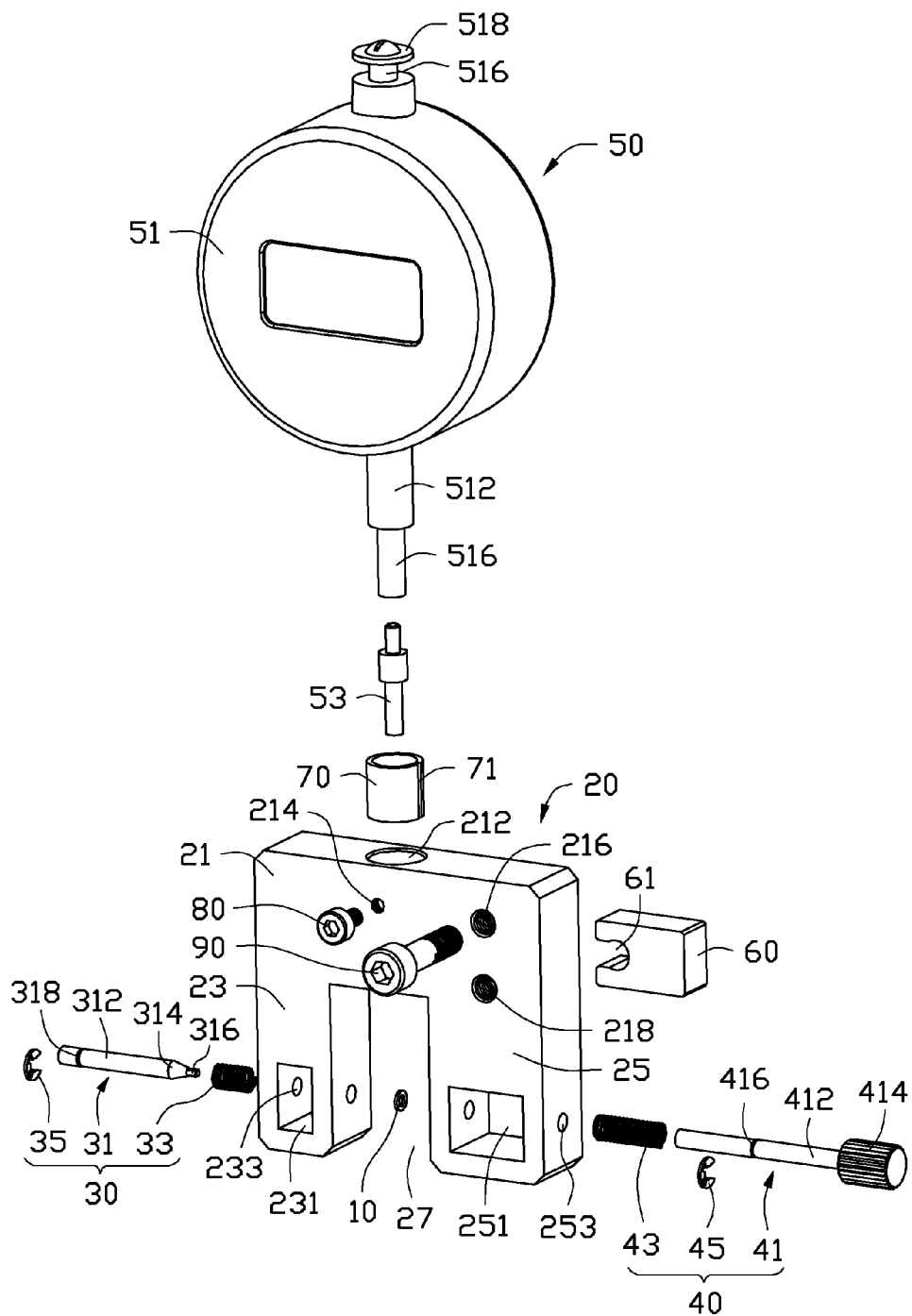
FIG. 1 is an exploded, isometric view of an exemplary embodiment of a concentricity test device together with a pierced round workpiece.
Figure 2:
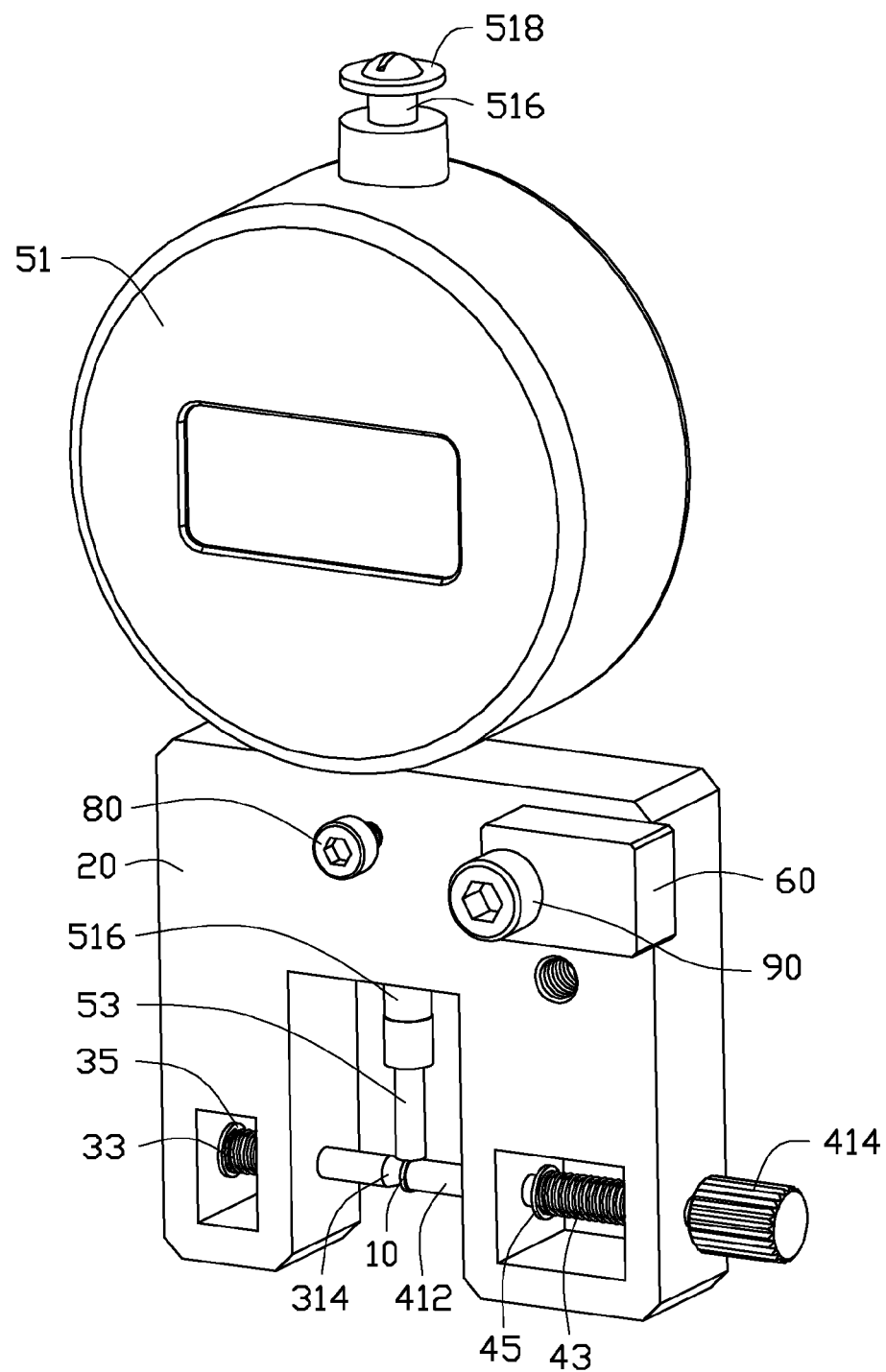
FIG. 2 is an assembled view of the concentricity test device and the workpiece of FIG. 1.

FIGS. 1 and 2 show an exemplary embodiment of a concentricity test device for testing concentricity of a thin, pierced round workpiece 10. The concentricity test device includes a bracket 20, a positioning member 30, an operation member 40, a probe indicator 50, and a distance-setting block 60.

The bracket 20 includes a first supporting arm 23, a second supporting arm 25 on a right side of the first supporting arm 23, and a beam 21 connected between the tops of the first and second supporting arms 23 and 25. A receiving space 27 is bounded by the beam 21 and the first and second supporting arms 23 and 25. A through hole 212 is defined in the beam 21 through the top and the bottom of the beam 21, in communication with a middle of the receiving space 27. A threaded locking hole 214, a first threaded hole 216 and a second threaded hole 218 are defined in the front side of the beam 21. The locking hole 214 extends backward to communicate with the through hole 212. A first receiving slot 231 and a first positioning hole 233 are defined in the first supporting arm 23. The first receiving slot 231 extends through front and rear sides of the first supporting arm 23. The first positioning hole 233 extends through left and right sides of the first supporting arm 23, in communication with the first receiving slot 231. A second receiving slot 251 and a second positioning hole 253 are defined in the second supporting arm 25. The second receiving slot 251 extends through front and rear sides of the second supporting arm 25. The second positioning hole 253 extends through left and right sides of the second supporting arm 25, in communication with the second receiving slot 251, and is coaxial with the first positioning hole 233.

The positioning member 30 includes a shaft 31, a first spring 33, and a first snap ring 35. The shaft 31 includes a columnar main body 312, a tapered head 314 extending outward from an end of the main body 312, and rectangular pin 316 extending outward from the middle of a distal end of the head 314 away from the main body 312. A circumferential groove 318 is defined in the main body 312 away from the head 314. A diameter of the head 314 gradually decreases in a direction towards the pin 316.

Figure 4:
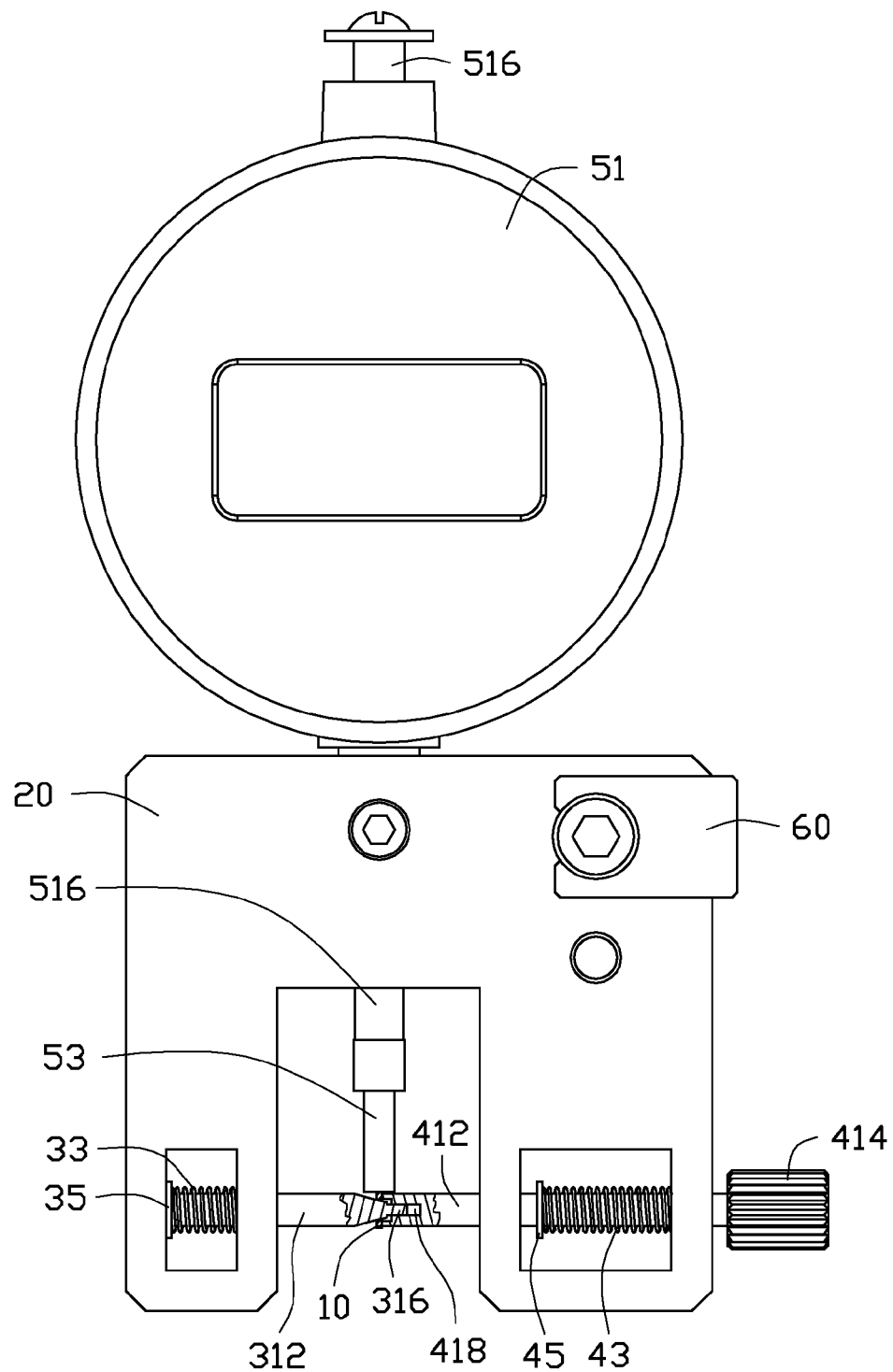

The operation member 40 includes a pole 41, a second spring 43, and a second snap ring 45. The pole 41 includes a columnar main body 412, and an operation portion 414 connected to an end of the main body 412. A circumferential groove 416 is defined in a middle of the main body 412. A stepped rectangular latching hole 418 (as shown in FIG. 4) is defined in the middle of a distal end of the main body 412 away from the operation portion 414.

The probe indicator 50 includes a digital display portion 51. A post 512 is formed on the bottom of the display portion 51. A spring-loaded probe 516 is vertically mounted in the display portion 51, with the bottom end of the probe 516 extending through the post 512, and the top end of the probe 516 extending through the top of the display portion 51. A stop portion 518 is connected to the top end of the probe 516. A flat-bottomed gauge head 53 is detachably connected to the bottom end of the probe 516.

The block 60 is made of plastic. A substantially C-shaped recess 61 is defined in an end of the block 60.

In assembly, the first spring 33 is received in the first receiving slot 231. The shaft 31 is placed beside the left side of the first supporting arm 23. The head 314 extends through the first positioning hole 233 and the first spring 33, and extends into the receiving space 27. The groove 318 is arranged in the first receiving slot 231. The first snap ring 35 is engaged in the groove 318 and abuts against a left inner surface of the first supporting arm 23 bounding the first receiving slot 231. The first spring 33 is placed around the main body 312 and sandwiched between the first snap ring 35 and a right inner surface of the first supporting arm 23 bounding the first receiving slot 231. Thereby, the shaft 31 is pivotably connected to the first supporting arm 23.

The second spring 43 is received in the second receiving slot 251. The pole 41 is placed beside the right side of the second supporting arm 25. A distal end of the pole 41 away from the operation portion 414 extends through the second positioning hole 253 and the second spring 43, and extends into the receiving space 27. The groove 416 is arranged in the second receiving slot 251. The second snap ring 45 is engaged in the groove 416. The second spring 43 is placed around the main body 412 and sandwiched between the second snap ring 45 and a right inner surface of the second supporting arm 25 bounding the second receiving slot 251. Thereby, the pole 41 is pivotably connected to the second supporting arm 25.

The pole 41 is coaxial with the shaft 31. The pole 41 may be pulled away from the positioning member 30 and rotated, to deform the second spring 43 and allow the latching hole 418 to align with the pin 316. When the pole 41 is released, the second spring 43 is restored to force the second snap ring 45 to move together with the pole 41 towards the positioning member 30, until the pin 316 and the distal end of the head 314 engage in the latching hole 418.

A sleeve 70 defining axially a slot 71 in a lateral side of the sleeve 70 is placed around the post 512. The gauge head 53 and the probe 516 are extended through the through hole 212 and extend into the receiving space 27. The sleeve 70 and the post 512 are received in the through hole 212. A fastener 80, such as a screw, is engaged in the locking hole 214 and tightly abuts against the sleeve 70. The slot 71 is narrowed to allow the sleeve 70 to tightly hold the post 512. Thereby, the probe indicator 50 is fixed to the bracket 20. The flat bottom end of the gauge head 53 abuts against the top of the distal end of the main body 412.

A fixing portion 90, such as a bolt, is partially engaged in the first threaded hole 216. The block 60 detachably clamps an outer section of the fixing portion 90 by the recess 61, thereby the block 60 is located between a head of fixing portion 90 and the beam 21.

Figure 3:
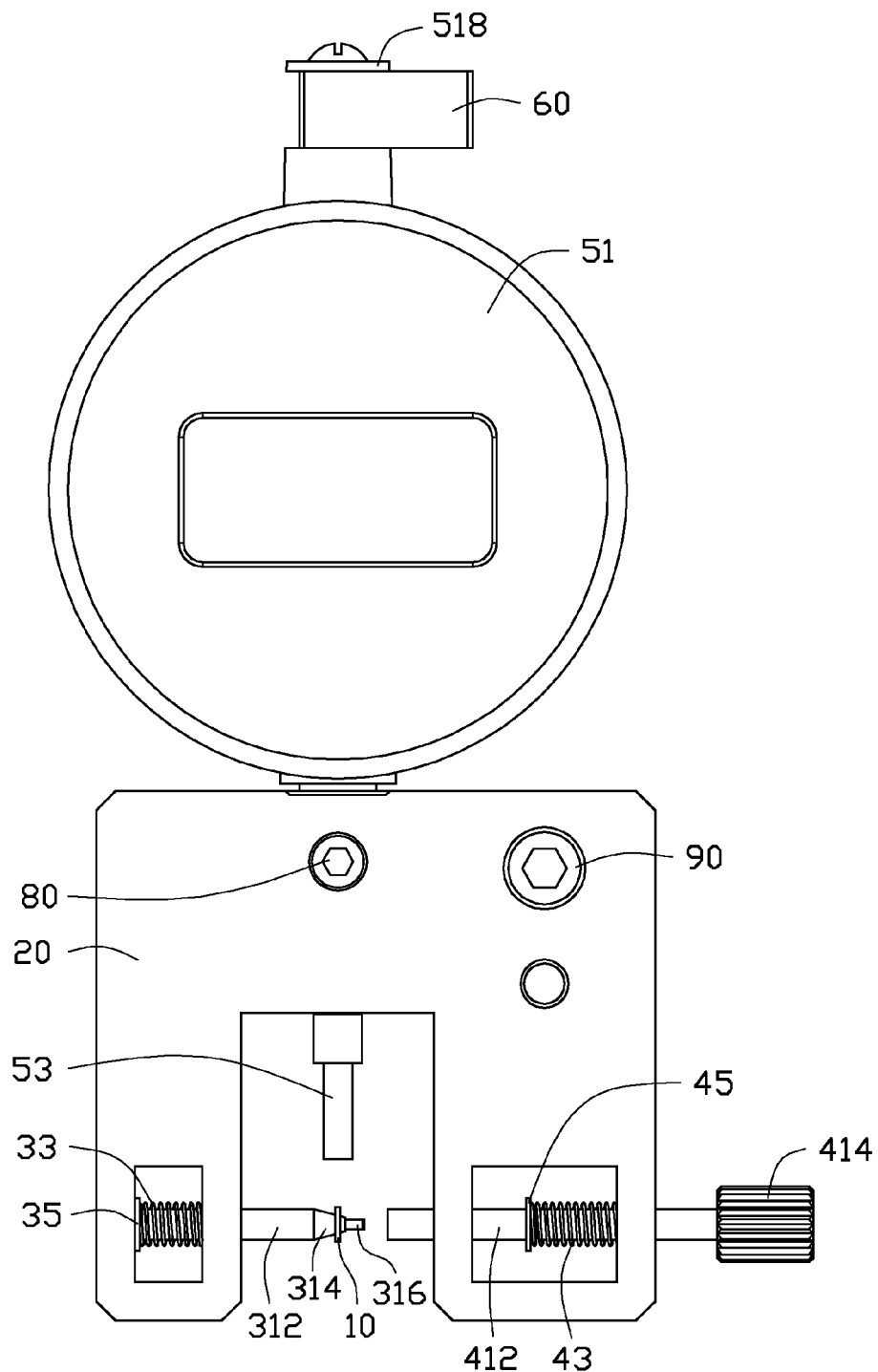
FIGS. 3 and 4 are front elevational views of the concentricity test device and the workpiece of FIG. 2 in different states, wherein the workpiece and a portion of the concentricity test device of FIG. 4 are cut away.

Referring to FIG. 3, in test, the bracket 20 is handheld, or fixed to a support by a screw extending through the second threaded hole 218 and engaging in the support. The block 60 is detached from the fixing portion 90. The stop portion 518 is pulled up, to allow the probe 516 to move up together with the gauge head 53. The top portion of the probe 516 adjacent to the stop portion 518 is engaged in the recess 61. The stop portion 518 is released, the probe 516 is restored to move down until the block 60 is sandwiched between the stop portion 518 and the top of the display portion 51. The gauge head 53 is spaced from the pole 41 and the shaft 31. The operation portion 414 is manipulated to move the pole 41 away from the shaft 31, and the second spring 43 is deformed.

The workpiece 10 is placed around the head 314. The pole 41 is released, and the second spring 43 is restored to move the pole 41 towards the shaft 31, until the pin 316 and the distal end of the head 314 engage in the latching hole 418. The distal end of the pole 41 abuts against the workpiece 10, and tightly locks the workpiece 10 to the head 314. The workpiece 10 is arranged right under the gauge head 53.

Referring to FIGS. 2 and 4, the block 60 is detached from the probe 516 and mounted to the fixing portion 90. The probe 516 is restored to move down until the gauge head 53 engages with a top of a circumference of the workpiece 10. The display portion 51 is set to zero. The operation portion 414 is manipulated to rotate the pole 41, and drives the shaft 31 and the workpiece 10 to rotate altogether with the pole 41. The probe 516 retracts or extends according to changes of distances between the top of the circumference and the central axis of the hole of the workpiece 10, to allow the gauge head 53 to always engage with the circumference of the workpiece 10 in the vertical direction.

The pole 41 is rotated through 360 degrees, the maximal value and the minimal value shown on the display portion 51 are got to calculate a difference value. Since the hole at the center of the workpiece 10 is held to precisely surround the central axis of the hole at the center of the workpiece 10, the difference value from the display portion 51 is equal to the maximal moving distance of the probe 516, and the concentricity of the workpiece 10. When the difference value is either zero or within an allowable range, the workpiece 10 is satisfactory, or passes. When the difference value is beyond the allowable range, the workpiece 10 is a failure.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A concentricity test device to test concentricity of a pierced round workpiece, the concentricity test device comprising:
    a bracket comprising a first supporting arm, a second supporting arm opposite to the first supporting arm, and a beam connected between tops of the first and second arms;
    a positioning member pivotably connected to the first supporting arm and comprising a shaft extending towards the second supporting arm, wherein the workpiece is to be placed around the shaft;
    an operation member pivotably connected to the second supporting arm and comprising a pole extending towards the shaft, wherein the pole is coaxial with the shaft and to be detachably engaged with the shaft to abut against the workpiece such that the workpiece is tightly placed on the shaft, and when the pole is rotated, the workpiece and the shaft are driven to rotate together with the pole; and
    a probe indicator fixed to the beam, and comprising a spring-loaded probe extending towards the workpiece placed on the shaft, and a gauge head connected to a bottom end of the probe to engage with a circumference of the workpiece,
    wherein when the pole is manipulated to rotated 360 degrees, the shaft and the workpiece are rotated 360 degrees together with the pole, values shown by the probe indicator show moving distances of the probe, and a maximal difference value of the moving distances of the probe is the concentricity of the workpiece.

2. The concentricity test device of claim 1, wherein the distal end of the gauge head is flat.

3. The concentricity test device of claim 1, wherein the shaft comprises a columnar main body, and a tapered head extending outward from an end of the main body adjacent to the pole, a diameter of the head gradually decreases in a direction towards the pole, the workpiece is tightly placed around the head.

4. The concentricity test device of claim 3, wherein the shaft further comprises a rectangular pin extending outward from a middle of a distal end of the head away from the main body, a stepped rectangular latching hole is defined in an end of the pole towards the shaft, the pin and the distal end of the head engage in the latching hole, with the end of the pole towards the shaft tightly abutting against the workpiece.

5. The concentricity test device of claim 1, wherein the first supporting arm defines a first positioning hole extending towards the second supporting arm, and a first receiving slot perpendicular to and communicating with the first positioning hole, the main body of the shaft is extended through the first positioning hole, the positioning member further comprises a first snap ring engaging with the main body and received in the first receiving slot, and a first spring placed around the main body and received in the first receiving slot, the first spring is sandwiched between the first snap ring and an inner surface of the first supporting arm bounding the first receiving slot.

6. The concentricity test device of claim 5, wherein a circumferential groove is defined in the main body away from the second supporting arm, the first snap ring engages with the groove of the main body, the first spring is sandwiched between the first snap ring and the inner surface of the first supporting arm adjacent to the second supporting arm.

7. The concentricity test device of claim 1, wherein the second supporting arm defines a second positioning hole extending towards the first supporting arm, and a second receiving slot perpendicular to and communicating with the second positioning hole, the pole is extended through the second positioning hole, the operation member further comprises a second snap ring engaging with the pole and received in the second receiving slot, and a second spring placed around the pole and received in the second receiving slot, the second spring is sandwiched between the second snap ring and an inner surface of the second supporting arm bounding the second receiving slot.

8. The concentricity test device of claim 7, wherein a circumferential groove is defined in the pole, the second snap ring engages with the groove of the pole, the second spring is sandwiched between the second snap ring and the inner surface of the second supporting arm away from the first supporting arm.

9. The concentricity test device of claim 8, wherein the pole comprises an operation portion exposed out of a side of the second supporting arm away from the first supporting arm.

10. The concentricity test device of claim 1, wherein the beam defines a through hole aligning with the workpiece, and a locking hole perpendicular to and communicating with the through hole, the probe indicator comprises a post received in the through hole, a bottom end of the probe and the gauge head are extended through the post and exposed out of a bottom side of the beam, a fastener is engaged in the locking hole and locked to the post.

11. The concentricity test device of claim 10, wherein a sleeve defining axially a slot in a lateral side of the sleeve is placed around the post and received in the through hole, the fastener is engaged in the locking hole and tightly abuts against the sleeve, the sleeve is contracted to tightly hold the post.

12. The concentricity test device of claim 1, wherein the probe indicator further comprises a display portion, top and bottom ends of the probe are respectively exposed out of top and bottom of the display portion, a stop portion is connected to the top end of the probe.

13. The concentricity test device of claim 12, further comprising a block, wherein the block is capable of being fixed to the top end of the probe and sandwiched to the stop portion and the top of the display portion, to separate the gauge head from the workpiece.

* * * * *